United States Patent

Nishita

(10) Patent No.: US 11,448,504 B2
(45) Date of Patent: Sep. 20, 2022

(54) SURVEYING DEVICE

(71) Applicant: TOPCON CORPORATION, Tokyo (JP)

(72) Inventor: Nobuyuki Nishita, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 337 days.

(21) Appl. No.: 16/048,430

(22) Filed: Jul. 30, 2018

(65) Prior Publication Data

US 2019/0041207 A1 Feb. 7, 2019

(30) Foreign Application Priority Data

Aug. 2, 2017 (JP) .............................. JP2017-149838

(51) Int. Cl.
*G01C 15/00* (2006.01)
*G01C 9/06* (2006.01)
*G01C 9/20* (2006.01)

(52) U.S. Cl.
CPC ............. *G01C 15/008* (2013.01); *G01C 9/06* (2013.01); *G01C 9/20* (2013.01); *G01C 15/002* (2013.01)

(58) Field of Classification Search
CPC ................. G01C 15/008; G01C 9/06
See application file for complete search history.

(56) References Cited

U.S. PATENT DOCUMENTS

| 6,138,367 A * | 10/2000 | Raby ....................... G01C 1/02 33/1 CC |
| 6,243,658 B1 | 6/2001 | Raby |
| 2003/0141466 A1* | 7/2003 | Ohtomo ............... G01C 15/002 250/559.38 |
| 2007/0081146 A1 | 4/2007 | Kumagai et al. |

(Continued)

FOREIGN PATENT DOCUMENTS

| JP | 2006-078416 A | 3/2006 |
| JP | 2007127628 A | 5/2007 |

(Continued)

OTHER PUBLICATIONS

Kelly, Engineering Mechanics, 1.5 Coordinate Transformation of Vector Components, University of Auckland, pp. 24-29 (Year: 2012).*

(Continued)

*Primary Examiner* — Lisa E Peters
(74) *Attorney, Agent, or Firm* — Chiesa Shahinian & Giantomasi PC

(57) ABSTRACT

A technique for preventing decrease in accuracy of measuring a tilt angle of a surveying device is provided. A total station includes a rotating unit, a horizontal angle measuring unit, a tilt sensor, and a tilt amount calculating part. The rotating unit has a distance measuring unit that performs optical surveying, and the rotating unit horizontally rotates. The horizontal angle measuring unit measures a rotation angle of the horizontal rotation of the rotating unit. The tilt sensor measures a tilt of the rotating unit relative to the (Continued)

direction of gravity. The tilt amount calculating part calculates a tilt of the rotating unit on the basis of measured values of the horizontal angle measuring unit before and after the rotating unit rotates.

13 Claims, 6 Drawing Sheets

(56) References Cited

U.S. PATENT DOCUMENTS

| | | | | |
|---|---|---|---|---|
| 2007/0104353 | A1* | 5/2007 | Vogel | G01C 15/00 |
| | | | | 382/106 |
| 2007/0180716 | A1* | 8/2007 | Hertzman | G01C 15/002 |
| | | | | 33/290 |
| 2009/0138233 | A1* | 5/2009 | Kludas | G06K 9/32 |
| | | | | 702/158 |
| 2009/0235541 | A1 | 9/2009 | Kumagai et al. | |
| 2011/0001986 | A1* | 1/2011 | Westermark | G01C 9/20 |
| | | | | 356/615 |
| 2012/0242830 | A1 | 9/2012 | Kumagai et al. | |
| 2015/0219455 | A1* | 8/2015 | Jordil | G01C 15/00 |
| | | | | 33/228 |

FOREIGN PATENT DOCUMENTS

| | | |
|---|---|---|
| JP | 2009-014368 A | 1/2009 |
| JP | 2009229192 A | 10/2009 |
| JP | 2012202821 A | 10/2012 |

OTHER PUBLICATIONS

Extended Search Report dated Jan. 4, 2019, in connection with European Patent Application No. 18183944.0, 7 pgs.
Notice of Reasons for Refusal dated Jun. 3, 2021, in connection with Japanese Patent Application No. 2017-149838, 6 pgs.

* cited by examiner

HORIZONTAL ANGLE OF TELESCOPE

XY COMPONENTS VARY WITH HORIZONTAL ANGLE OF HOUSING

SURVEYING DEVICE

CROSS-REFERENCE TO RELATED APPLICATION

This application is based upon and claims the benefit of priority from Japanese Patent Application No. 2017-149838, filed Aug. 2, 2017, the entire contents of which are incorporated herein by reference.

BACKGROUND OF THE INVENTION

The present invention relates to a technique for measuring tilt of a surveying device.

A surveying device should be located and be adjusted with attention paid so as not to cause tilting when in use. Nevertheless, the surveying device may sometimes be used in a slightly tilted condition due to any number of reasons. A typical surveying device includes a tilt sensor for measuring tilt when in a tilted condition, and the tilt information of the surveying device measured by the tilt sensor is used to correct a measured value. A tilt sensor with a mechanism for optically measuring tilt of a liquid surface is publicly known. For example, one such tilt sensor is disclosed in Japanese Unexamined Patent Application Laid-Open No. 2007-127628.

A tilt sensor using a liquid surface has high accuracy and high reliability with a simple structure. However, when a surveying device rapidly rotates horizontally, the measurement accuracy can decrease for a number of reasons: a liquid (normally, oil) viscosity-dependent delay that causes low followability, an inclination generated by centrifugal force, a change in shape of the liquid surface by acceleration, and other factors. The influence of fluctuation of the liquid surface can be reduced by an averaging process in which, for example, an average of values of the tilt over four seconds may be used. This averaging process can also decrease responsiveness and measurement accuracy. Additionally, fluctuation in viscosity of the liquid due to temperature change can also affect the responsiveness.

For example, in a case of locating an unmanned aerial vehicle (UAV) by a total station (TS) while tracking the flying UAV, high responsiveness is required in locating the UAV in order to follow rapid variation in optical axis orientation of the TS. In this case, the orientation of the optical axis of the TS may rapidly vary in response to turning and other motions of the UAV. In this situation, a tilt sensor that uses a liquid surface measures a tilt angle at an accuracy that is degraded for reasons described above.

BRIEF SUMMARY OF THE INVENTION

In view of these circumstances, an object of the present invention is to provide a technique for preventing decrease in accuracy of measuring a tilt angle of a surveying device.

A first aspect of the present invention provides a surveying device including a rotating unit, a horizontal rotation angle sensor, a tilt sensor, and a tilt calculating unit. The rotating unit includes an optical device that performs optical surveying, and the rotating unit is horizontally rotatable. The horizontal rotation angle sensor measures a horizontal rotation angle of the rotating unit. The tilt sensor measures a tilt of the rotating unit relative to the direction of gravity. The tilt calculating unit calculates a tilt of the rotating unit after the rotating unit rotates, on the basis of outputs from the horizontal rotation angle sensor and the tilt sensor before the rotating unit rotates and on the basis of an output from the horizontal rotation angle sensor after the rotating unit rotates.

According to a second aspect of the present invention, in the first aspect of the present invention, the tilt calculated by the tilt calculating unit may be represented by an X component value and a Y component value (x, y) under the condition that a vertical vector along a vertical axis of the rotating unit is projected on an X-Y horizontal plane. The X component value and the Y component value (x, y) may be calculated by the following First Formula in which the X component value and the Y component value before the rotation are represented as $(x_0, y_0)$, a measured value from the horizontal rotation angle sensor before the rotation is represented as $\theta_0$, and a measured value from the horizontal rotation angle sensor after the rotation is represented as $\theta$.

$$\begin{pmatrix} x \\ y \end{pmatrix} = \begin{pmatrix} \cos(\theta - \theta_0) & \sin(\theta - \theta_0) \\ -\sin(\theta - \theta_0) & \cos(\theta - \theta_0) \end{pmatrix} \begin{pmatrix} x_0 \\ y_0 \end{pmatrix} \quad \text{First Formula}$$

According to a third aspect of the present invention, in the second aspect of the present invention, the X component value and the Y component value $(x_0, y_0)$ may be obtained in a condition in which the rotating unit is in a stationary state.

According to a fourth aspect of the present invention, in the second aspect of the present invention, the surveying device may further include a support that supports the rotating unit so as to be horizontally rotatable. The support may be arranged with an additional tilt sensor. The additional tilt sensor may measure a tilt of the support while the rotating unit rotates horizontally. The X component value and the Y component value (x, y) may be corrected on the basis of a value measured by the additional tilt sensor.

According to a fifth aspect of the present invention, in the fourth aspect of the present invention, under the conditions that a value measured by the additional tilt sensor is represented as (Cx, Cy), and an initial value of the additional tilt sensor is represented as (Cx0, Cy0), the X component value and the Y component value (x, y) that are calculated by the First Formula may be corrected to (x+Cx−Cx0, y+Cy−Cy0).

The present invention provides a technique for preventing decrease in accuracy of measuring a tilt angle of a surveying device.

DETAILED DESCRIPTION OF THE INVENTION

1. First Embodiment

Figure 1:
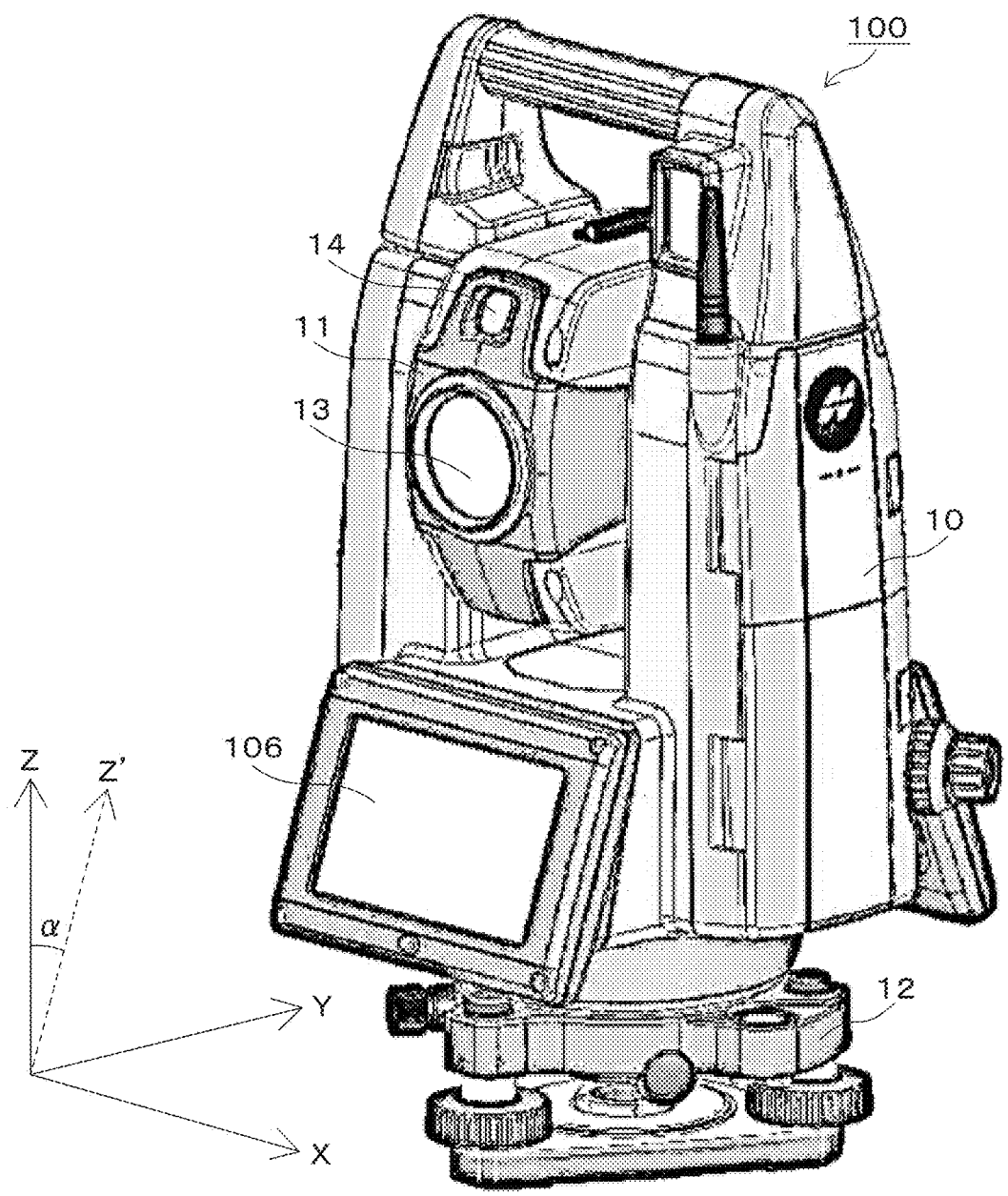
FIG. 1 is a perspective view of a total station (TS).

Configuration
FIG. 1 illustrates a total station (TS) 100. The TS 100 measures a distance or a direction to a target by means of laser distance measurement to determine a three-dimensional location of the target based on the origin set at its location. FIG. 1 illustrates a condition in which a vertical axis Z' of the TS 100 tilts at an angle α relative to the gravity direction axis. Details relating to the TS 100 may be found in Japanese Unexamined Patent Applications Laid-Open Nos. 2009-229192 and 2012-202821, for example.

The TS 100 includes a base 12, a main unit 10, and a vertically rotatable unit 11. The base 12 may be fixed on a top of a tripod (not shown). The main unit 10 is supported in a horizontally rotatable manner by the base 12. The vertically rotatable unit 11 is held by the main unit 10 so as to be upwardly and downwardly rotatable in a vertical direction to face at an elevation angle or a depression angle relative to the main unit 10. The vertically rotatable unit 11 includes a telescope 13 and an optical window 14 for a laser scanner, as well as incorporates a distance measuring unit 110 (refer to FIG. 2) that measures a distance by using laser light.

The telescope 13 is an optical system that obtains an image of an object, and the telescope 13 incorporates an optical set for distance measuring laser light. The telescope 13 has an objective lens through which the distance measuring laser light is emitted to the object and is reflected back to and taken in the vertically rotatable unit 11. The TS 100 also includes a display 106 using a touch panel display. The display 106 functions as an operation panel, by which an operator performs operations, and also functions a display screen. The TS 100 also includes various kinds of adjusting dials, a communication antenna, and other units, which are the same as those of an ordinary TS, and therefore, descriptions thereof are omitted.

Figure 2:
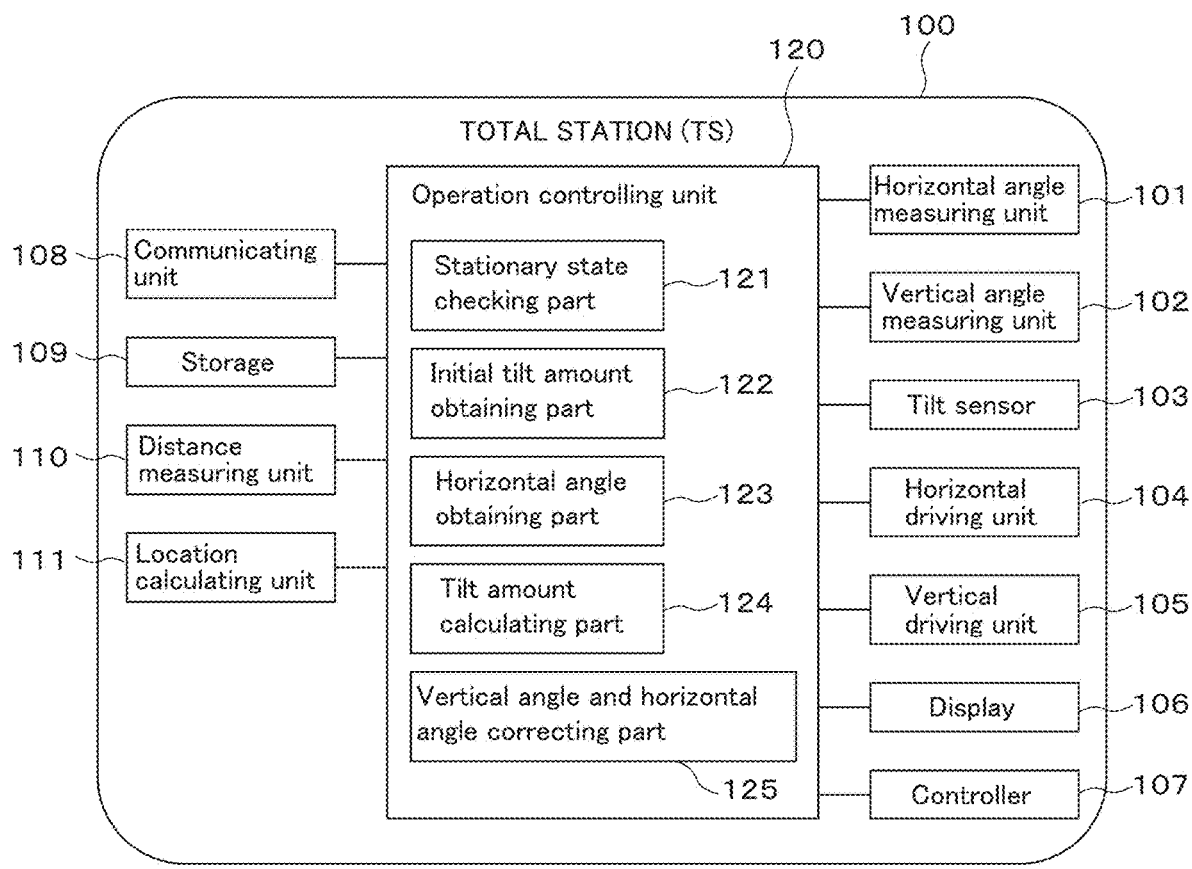
FIG. 2 is a block diagram of the TS.

FIG. 2 illustrates a block diagram of the TS 100. The TS 100 includes a horizontal angle measuring unit 101, a vertical angle measuring unit 102, a tilt sensor 103, a horizontal driving unit 104, a vertical driving unit 105, a display 106, a controller 107, a communicating unit 108, a storage 109, a distance measuring unit 110, a location calculating unit 111, and an operation controlling unit 120.

The horizontal angle measuring unit 101 measures a horizontal rotation angle of the main unit 10 relative to the base 12. The horizontal angle measuring unit 101 includes a rotary encoder and a peripheral circuit that outputs information from the rotary encoder as angular information. The horizontal rotation is performed around the vertical axis of the TS 100. Assuming that the TS 100 is installed with no tilt, the rotation axis of the horizontal rotation of the main unit 10 coincides with the gravity direction axis. The horizontal rotation angle is measured, for example, relative to the north direction in a clockwise direction.

The vertical angle measuring unit 102 measures a vertical angle of the vertically rotatable unit 11 in terms of an elevation angle and a depression angle. The mechanism of the angle measurement is the same as that of the horizontal angle measuring unit 101. The vertical angle is output under the conditions that the angle is 0 degrees at the zenith, 90 degrees in the horizontal direction, and 180 degrees in the vertical downward direction.

The tilt sensor 103 is arranged to the main unit 103 and measures a tilt of the vertical axis of the main unit 10 relative to the direction of gravity. In a case illustrated in FIG. 1, information relating to the angle α is measured by the tilt sensor 103. The principle of the tilt sensor 103 is the same as that disclosed in Japanese Unexamined Patent Application Laid-Open No. 2007-127628.

Figure 3:
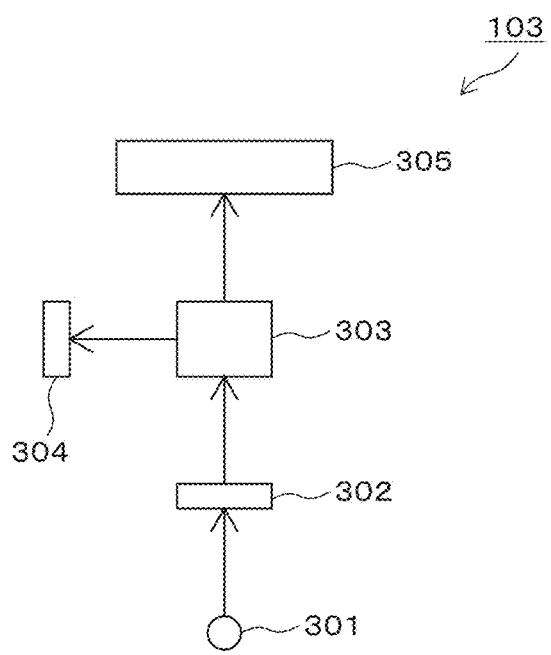
FIG. 3 is a block diagram of a tilt sensor.

FIG. 3 illustrates a conceptual diagram of the tilt sensor 103. The tilt sensor 103 has a light source 301, an optical system 302, a half mirror 303, a light receiving element 304, and a liquid surface 305. The light source 301 is constituted of a light emitting diode and other parts. Light from the light source 301 penetrates through the optical system 302 and thereby has a projection pattern such as a lattice pattern, a grid point pattern, a concentric circular pattern, or other pattern, and the patterned light is projected to the liquid surface 305 through the half mirror 303. The projected light is reflected at the liquid surface 305, further reflected at the half mirror 303, and measured by the light receiving element 304.

The light receiving element 304 may be a CCD sensor or a CMOS image sensor and measures a projected pattern of the light reflected at the liquid surface 305. The liquid surface 305 is a liquid surface of a liquid such as oil and may tilt from a horizontal plane. This tilt generates distortion in the projected pattern of the light reflected at the liquid surface 305, and the distorted projected pattern is measured by the light receiving element 304. The distortion represents the tilt of the liquid surface 305. This tilt information is obtained as a tilt amount, which is described later, and the tilt amount is represented by an X component and Y component (x, y) that are orthogonal components of a vector projected to the horizontal plane.

The horizontal driving unit 104 has a motor and a driving circuit of the motor. This motor drives to horizontally rotate the main unit 10 relative to the base 12. The vertical driving unit 105 has a motor and a driving circuit of the motor. This motor controls an elevation angle and a depression angle of the vertically rotatable unit 11.

The display 106 is a touch panel display that displays information relating to control of the TS 100, measurement results, and other various kinds of information. The controller 107 has various kinds of switches and other tools to be operated by an operator that uses the TS 100. In this embodiment, the display 106 is a touch panel display and functions also as the controller 107. The display 106 displays various kinds of operation buttons and other tools that are pressed by a finger to control the TS 100.

The communicating unit 108 communicates with an external device. The communication type may include a wired communication, a wireless communication, and an optical communication. The external device may include a terminal for remotely controlling the TS 100, a GPS device, a personal computer (PC), a smart phone, and an external memory. The communication may be performed by connecting to an internet line from the communicating unit 108.

The storage 109 stores an operation program necessary to operate the TS 100, various kinds of information, and measurement results. The distance measuring unit 110 measures a distance to a target object by means of laser distance measurement. The measurement principle is the same as that of an ordinary laser distance measurement.

The location calculating unit 111 calculates a three-dimensional location of the target relative to the TS 100 on the basis of the distance to the target measured by the distance measuring unit 110 by means of laser distance measurement and on the basis of the orientation of the optical system of the distance measuring unit 110, more exactly, of the telescope 13, at the time the distance is measured. Prior to this measurement, the location in a map coordinate system of the TS 100 is accurately obtained in advance. This enables measuring a location in the map coordinate system of the target by using the TS 100. The map coordinate system is a coordinate system for describing map data. Parameters indicating a location in the map coordinate system are, for example, latitude, longitude, and altitude from mean sea level.

The operation controlling unit 120 performs various kinds of calculations and controls relating to operation of the TS 100. The operation controlling unit 120 functions as a computer and includes a central processing unit (CPU), a memory circuit, an interface circuit, and other circuits necessary to function as the computer.

The operation controlling unit 120 includes a stationary state checking part 121, an initial tilt amount obtaining part 122, a horizontal angle obtaining part 123, a tilt amount calculating part 124, and a vertical angle and horizontal angle correcting part 125. Some or all of these functioning parts may be constructed of software so that programs are executed by a CPU or may be implemented by using dedicated electronic circuits such as programmable logic devices (PLDs).

The stationary state checking part 121 checks the stationary state of the main unit 10 relative to the base 12 on the basis of the output from the horizontal angle measuring unit 101. Specifically, when the horizontal angle measuring unit 101 measures no variation in the horizontal angle of the main unit 10 for a predetermined period, the main unit 10 is recognized as being in the stationary state.

The initial tilt amount obtaining part 122 obtains a tilt amount of the TS 100 relative to the direction of gravity when the TS 100 is recognized as being in the stationary state by the stationary state checking part 121. This stationary state is referred as an initial condition. The obtained tilt amount is represented as a tilt initial value $(x_0, y_0)$. The tilt amount is a parameter that quantitatively represents the angle α in FIG. 1 and is measured by the tilt sensor 103.

Figure 4:
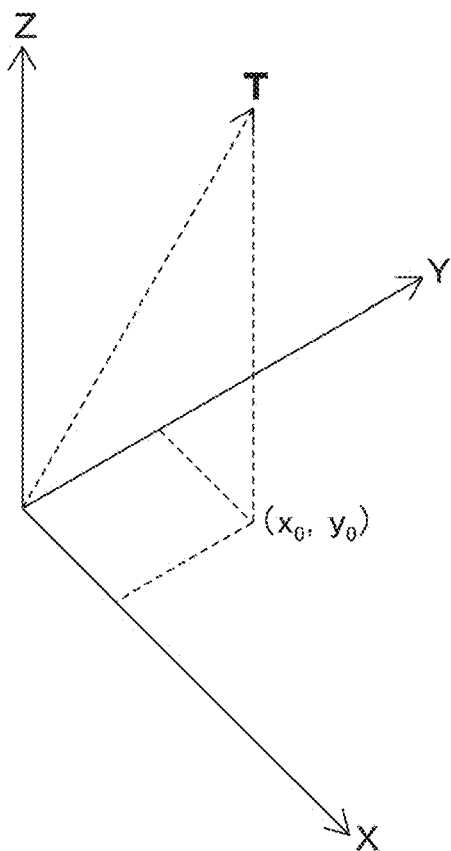
FIG. 4 is an explanatory diagram for explaining a tilt amount.

Hereinafter, details of the tilt amount are described. FIG. 4 illustrates an XYZ coordinate system that is fixed relative to the main unit 10 and that rotates in conjunction with the main unit 10. The Z axis in FIG. 4 orients in a vertical upward direction.

A vector T has a predetermined length toward the vertical axis of the TS 100, which is the rotation axis of the main unit 10. A tilt amount in the coordinate system fixed relative to the main unit 10 is represented by an x component and y component of the vector T in the coordinate system in FIG. 4.

In a case in which there is no tilt in the TS 100, that is, the vertical axis of the TS 100 coincides with the direction of gravity, the vector T orients in the direction of gravity, and the vector T has no x component and no y component. In a case in which there is a tilt in the TS 100, the vector T has at least one of the x component and the y component in the coordinate system in FIG. 4.

The horizontal angle obtaining part 123 obtains a horizontal rotation angle of the main unit 10 from the output from the horizontal angle measuring unit 101. The horizontal angle is described, for example, relative to the north direction in a clockwise direction.

The tilt amount calculating part 124 calculates a tilt amount (x, y) at a predetermined horizontal rotation angle θ. Hereinafter, calculation of the tilt amount (x, y) at the horizontal rotation angle θ, which is performed by the tilt amount calculating part 124, is described.

With rotation of the main unit 10, the XYZ coordinate system in FIG. 4 also rotates around the Z axis. This rotation varies the XY components of the vector T in the XYZ coordinate system fixed relative to the main unit 10. The following describes this phenomenon by referring to FIG. 5.

Figure 5:
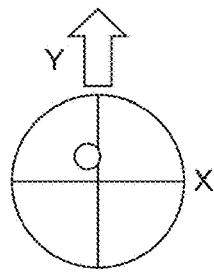
FIG. 5 is an explanatory diagram for explaining variation in a tilt amount accompanying horizontal rotation.
Figure 5:
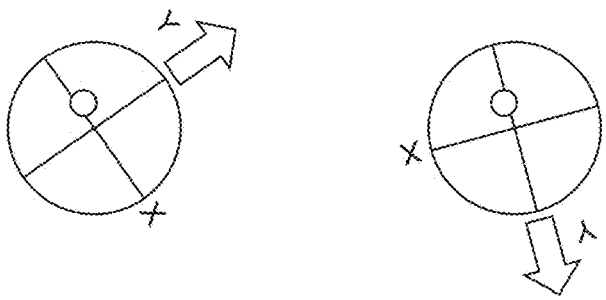

FIG. 5 illustrates a conceptual diagram of a situation of downwardly viewing a bubble in a tilt sensor of a type that measures tilt by the position of the bubble. FIG. 5 illustrates a case in which the tilt sensor slightly tilts relative to the direction of gravity, and thus, the bubble exists at a position deviated from an intersection point at the center of a cross mark. Herein, an X coordinate value and a Y coordinate value representing the position of the bubble correspond to the tilt amount. In this case, with horizontal rotation of the tilt sensor, the position of the bubble varies relative to the X and Y coordinate axes in a visual field.

It is necessary to quantitatively determine the condition of tilt of the main unit 10 at a horizontal angle θ after the main unit 10 horizontally rotates. This is because surveying results at the horizontal angle θ, which are outputs from the horizontal angle measuring unit 101 and the vertical angle measuring unit 102, must be corrected in accordance with the condition of the tilt of the main unit 10 at the time the measurements are taken. The condition of the tilt at the horizontal angle θ is quantitatively represented by the tilt amount (x, y) in the XYZ coordinate system fixed relative to the main unit 10 at the time the measurements are taken. Thus, the determination of the tilt amount (x, y) enables correction, in consideration of the tilt, of measured amounts of the horizontal angle and the vertical angle relating to the direction of the target, which are obtained at the horizontal angle θ after the main unit 10 horizontally rotates.

The case illustrated in FIG. 5 shows rotation of an XY coordinate system. As illustrated in FIG. 5, the absolute position of the bubble relative to the ground does not vary with the rotation of the XY coordinate system. The XY coordinate position of the bubble after the rotation is calculated from a coordinate conversion formula that is established for a case of rotating the XY coordinate system.

That is, when the main unit 10 rotates, the coordinate system fixed relative to the main unit 10 also rotates, and the x component and the y component (x, y) of the tilt amount in this coordinate system vary. This variation is calculated from the coordinate conversion formula that is established for a case of rotating the XYZ coordinate system around the Z axis.

The coordinate conversion formula is described as the following First Formula in which an initial value of the tilt amount is represented as $(x_0, y_0)$, an initial value of the horizontal angle is represented as $θ_0$ that is obtained when $(x_0, y_0)$, a horizontal angle after horizontal rotation is performed from the initial value $θ_0$ is represented as θ, and a tilt amount at the horizontal angle θ is represented as (x, y).

$$\begin{pmatrix} x \\ y \end{pmatrix} = \begin{pmatrix} \cos(θ-θ_0) & \sin(θ-θ_0) \\ -\sin(θ-θ_0) & \cos(θ-θ_0) \end{pmatrix} \begin{pmatrix} x_0 \\ y_0 \end{pmatrix} \quad \text{First Formula}$$

The First Formula defines a tilt amount (x, y) in a new XYZ coordinate system that is set after the main unit 10 rotates by $(θ-θ_0)$ in a condition in which the tilt amount is at the initial value $(x_0, y_0)$. With the use of the First Formula, the condition of the tilt of the main unit 10 at the horizontal angle θ after the rotation is quantitatively determined.

As described above, the tilt amount (x, y) at the horizontal angle θ is calculated from the First Formula by using the initial value of the horizontal angle, which is represented as $θ_0$, and the initial value of the tilt amount, which is represented as $(x_0, y_0)$.

The tilt amount (x, y) calculated from the First Formula is a value calculated using the variation in the horizontal angle and is not a value directly obtained from the tilt sensor 103. This is because the tilt sensor 103 may not be satisfactory in accuracy in a case in which the horizontal angle rapidly varies, as described above. From this point of view, in such cases, estimation of the tilt amount using the First Formula is useful.

The vertical angle and horizontal angle correcting part 125 uses the tilt amount calculated by the tilt amount calculating part 124, to correct angles measured by the horizontal angle measuring unit 101 and the vertical angle measuring unit 102, that is, an angle in the horizontal direction and an angle in the vertical direction of the target as viewed from the TS 100. This process is the same as an existing correction process for correcting the measured value of the horizontal angle and the measured value of the vertical angle on the basis of the tilt amount measured by a tilt sensor.

When there is no tilt in the main unit 10 of the TS 100, the angles measured by the horizontal angle measuring unit 101 and the vertical angle measuring unit 102 can be used without any correction. However, in most cases, it is difficult to correctly level the TS 100 for various reasons, and some degree of tilt cannot be avoided. In such cases, the tilt of the main unit 10 is calculated from the First Formula, and the measured value is corrected by using this tilt. This correction is performed by the vertical angle and horizontal angle correcting part 125.

Example of Processing

Figure 6:
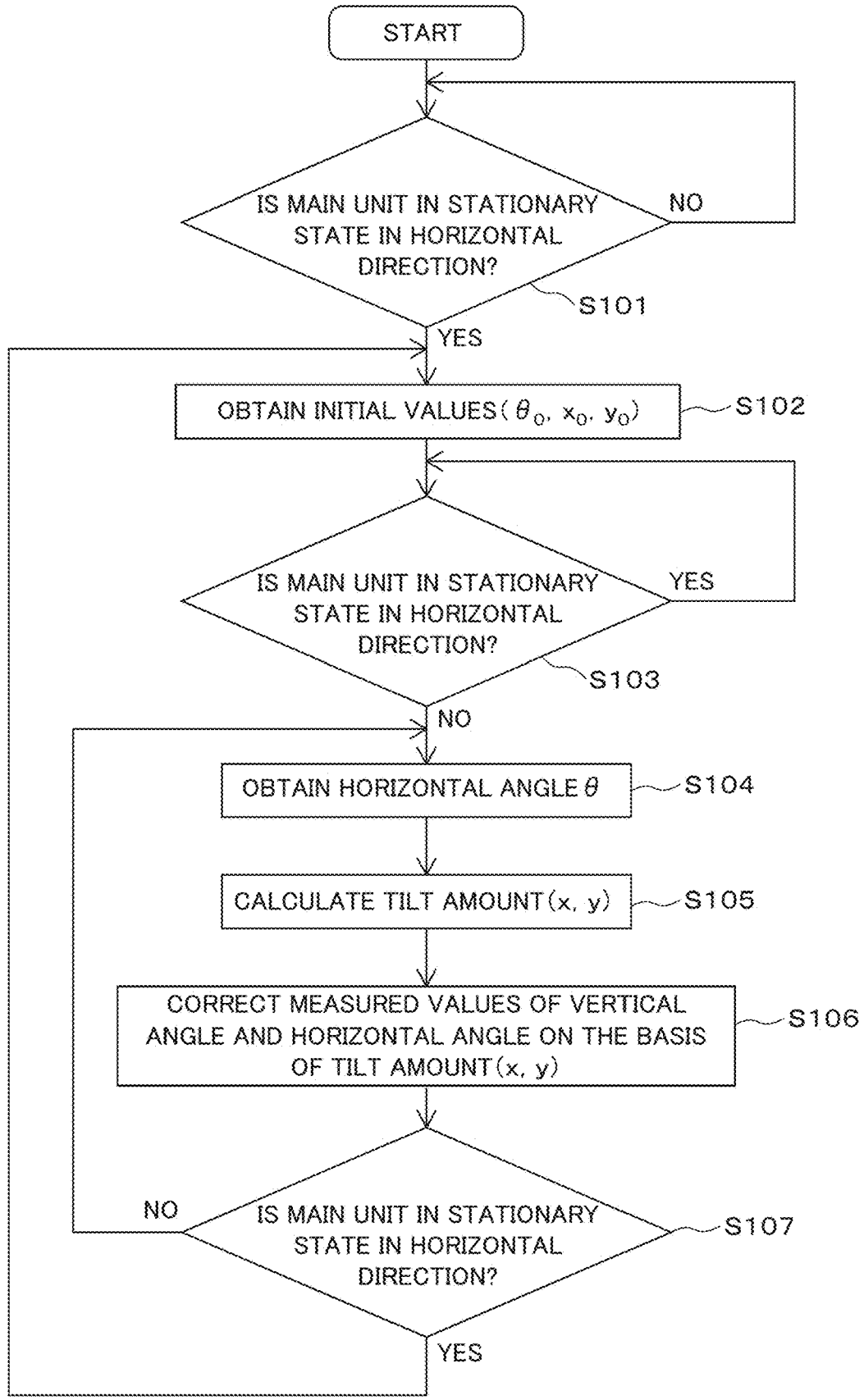
FIG. 6 is a flow chart showing an example of a processing procedure.

FIG. 6 illustrates an example of a processing procedure executed by the operation controlling unit 120. Programs for executing the steps in the flowchart in FIG. 6 are stored in the storage 109. The programs can be stored in an appropriate storage medium or a storage server and can be provided therefrom.

After the process starts, whether the main unit 10 is in the stationary state, that is, whether there is variation in the horizontal angle, is determined (step S101). The process of this step is performed by the stationary state checking part 121. In the process of this step, whether the horizontal angle measuring unit 101 measures no variation in the horizontal angle for a predetermined period is determined. The predetermined period is, for example, 5 seconds or 10 seconds. In view of the time until the liquid surface of the tilt sensor 103 settles and the time necessary for an averaging process for the liquid surface, a check of the stationary state is preferably performed in conditions in which the variation in the horizontal angle is not measured for at least 5 seconds.

In the process in step S101, if there is no variation in the horizontal angle for the predetermined time, the main unit 10 is determined as being in the stationary state, and the process advances to step S102. Otherwise, the process in step S101 is repeated.

In step S102, an initial value of the horizontal angle as a reference value, which is represented as $\theta_0$, and an initial value of the tilt amount, which is represented as $(x_0, y_0)$, are obtained. Thereafter, whether the rotation in the horizontal direction of the main unit 10 is in the stationary state is determined (step S103). If the main unit 10 is not in the stationary state, and the horizontal angle varies, a horizontal angle $\theta$ after the rotation is obtained (step S104). If the main unit 10 is in the stationary state, or the horizontal angle does not vary for the predetermined time, the process in step S103 is repeated.

After the horizontal angle $\theta$ varied due to rotation is obtained in step S104, a tilt amount (x, y) at the horizontal angle $\theta$ is calculated from the First Formula (step S105). The process of this step is performed by the tilt amount calculating part 124. After the tilt amount (x, y) is calculated, this tilt amount is used to correct measured values of the horizontal angle measuring unit 101 and the vertical angle measuring unit 102 at the horizontal angle $\theta$ (step S106). The process of this step is performed by the vertical angle and horizontal angle correcting part 125.

Thereafter, whether there is variation in the horizontal angle is determined. If there is no variation in the horizontal angle, the process in step S102 and the subsequent steps is performed. Otherwise, if there is variation in the horizontal angle, the process in step S104 and the subsequent steps is performed.

Evaluation of Effects

Figure 7:
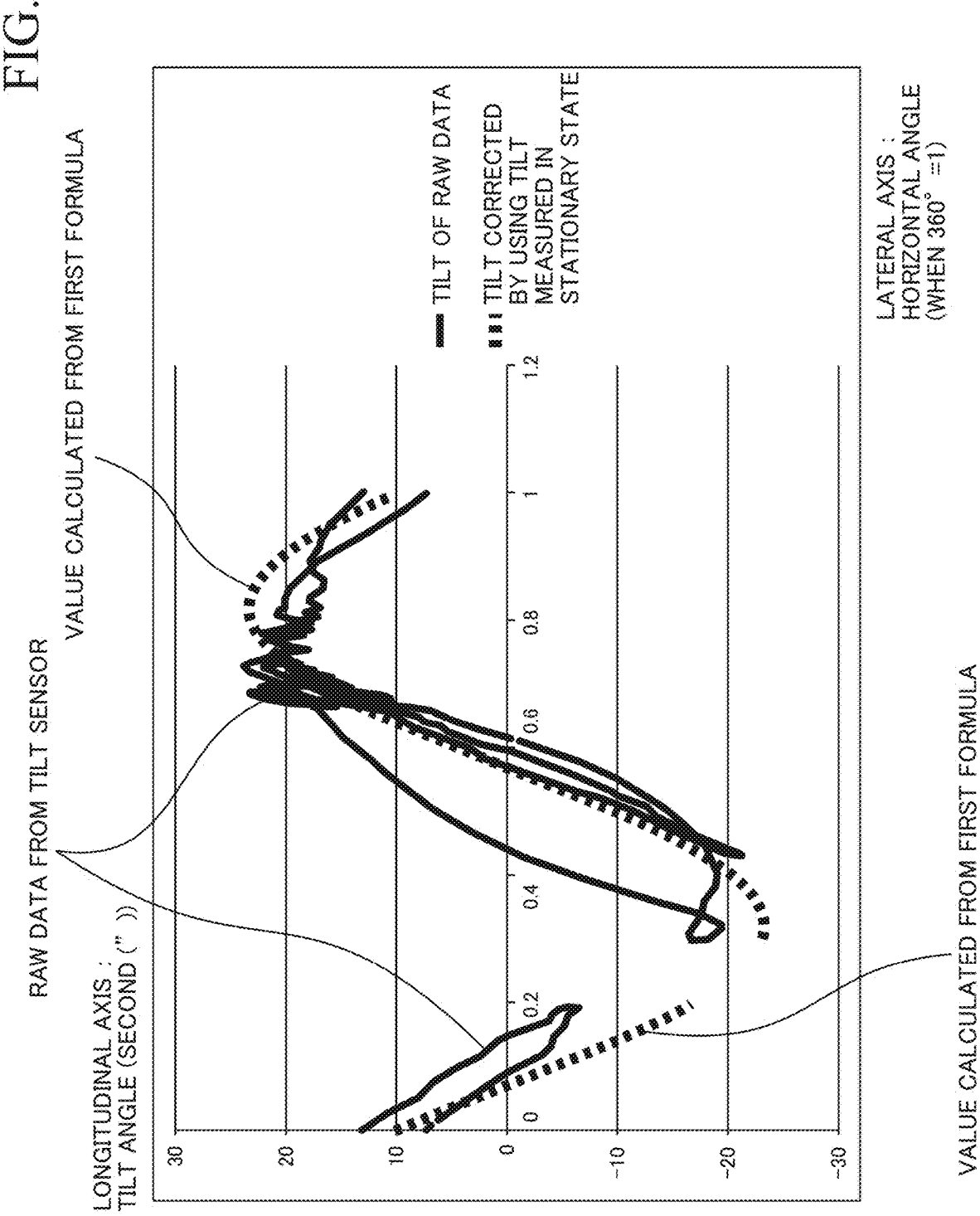
FIG. 7 is a graph showing raw data and corrected data of measured values of a tilt angle.

FIG. 7 illustrates calculation data of a tilt angle obtained from the First Formula and raw data of the tilt angle based on the output from the tilt sensor 103. FIG. 7 illustrates a longitudinal axis that represents a tilt angle in a specific direction in a horizontal plane and illustrates a lateral axis that represents a horizontal angle measured by the horizontal angle measuring unit 101.

Theoretically, the tilt angle in FIG. 7 varies in the manner of a sine curve in accordance with the variation in the horizontal angle. Considering this, the output from the tilt sensor 103 illustrated in FIG. 7 could not follow the rapid variation in the horizontal angle, and the measured value greatly fluctuated when the angle direction was reversed. This is due to fluctuation of the liquid surface, change in shape of the liquid surface by acceleration, and low followability of the liquid surface to the rapid rotation.

In contrast, the tilt angle calculated by using the First Formula varied in the manner of the sine curve and did not fluctuate. This result shows that the present invention enables obtaining a tilt angle that follows the variation in the horizontal angle.

Advantages

As described above, the TS 100 includes the main unit 10, the horizontal angle measuring unit 101, the tilt sensor 103, and the tilt amount calculating part 124. The main unit 10 has the distance measuring unit 110 that performs optical surveying, and the main unit 10 horizontally rotates as a rotating unit. The horizontal angle measuring unit 101 measures a rotation angle of the horizontal rotation of the main unit 10. The tilt sensor 103 measures a tilt of the main unit 10 relative to the direction of gravity. The tilt amount calculating part 124 calculates a tilt of the main unit 10 on the basis of the measured values of the horizontal angle measuring unit 101 before and after the main unit 10 rotates.

This configuration enables calculating the tilt amount on the basis of the horizontal angle, thereby obtaining data relating to the tilt with high accuracy by following rapid variation in the horizontal angle, even when the tilt sensor 103 has low responsiveness and the measurement accuracy of the tilt amount is low due to the rapid variation in the horizontal angle.

Accordingly, for example, in a case of tracking a flying UAV by a TS, measured value relating to the tilt of the TS is corrected in real time with high followability to a rapid direction change and a rapid turn of the UAV.

In another case, parameters obtained as the initial value $(x_0, y_0)$ may vary because a tip of a tripod supporting the TS 100 gradually digs into the ground or because of other reasons. According to the process illustrated in FIG. 6, if no variation in the horizontal angle is recognized, the process in step S102 is performed again, and the initial value is obtained again to update the initial value. Thus, the initial value is dynamically updated, and generation of error due to variation in the initial value is prevented.

2. Second Embodiment

The process in FIG. 6 does not update the initial value ($x_0$, $y_0$) in a situation in which the horizontal angle continuously varies. That is, the process in FIG. 6 needs temporary suspension of the variation in the horizontal angle to update the initial value. Thus, in a case in which the tilt amount or the initial value ($x_0$, $y_0$) varies while the main unit 10 rotates or the main unit 10 is recognized as not being in the stationary state, the tilt amount (x, y) calculated from the First Formula may contain a calculation error.

In this embodiment, in addition to the tilt sensor 103 that measures the tilt of the main unit 10, an additional tilt sensor that measures tilt of the base 12 is prepared. This additional tilt sensor obtains tilt information of the base 12 even while the horizontal angle of the main unit 10 varies, and the tilt amount is corrected in real time based on the variation in the tilt condition of the base 12.

Figure 8:
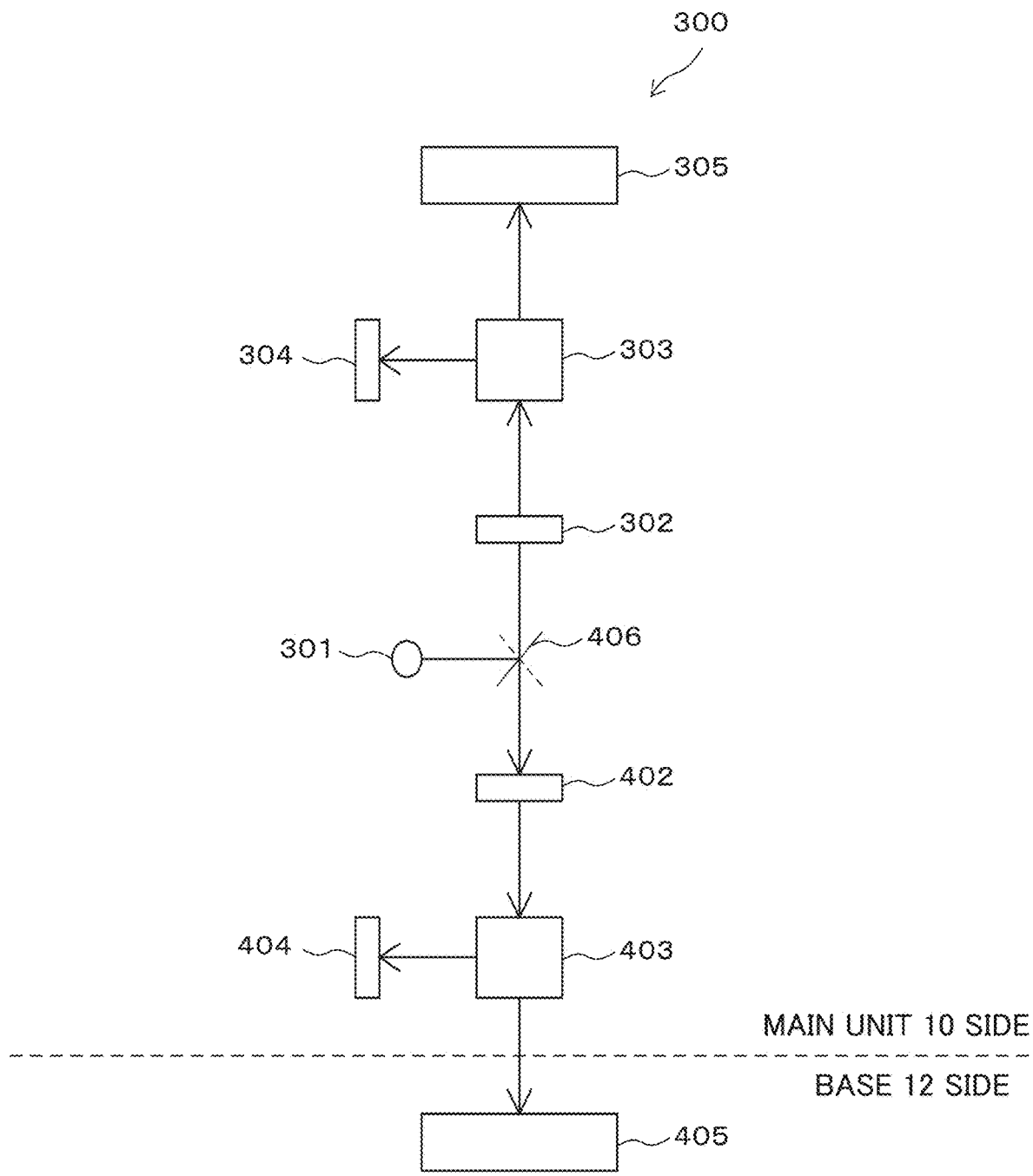
FIG. 8 is a block diagram of another tilt sensor.

FIG. 8 is a conceptual diagram of a tilt sensor 300 having two tilt measuring units with a common light source. In this example, a tilt sensor unit having the same structure as in FIG. 3 is arranged at the main unit 10 side, and a liquid surface 405 is arranged at the base 12 side.

With this configuration, the tilt of the liquid surface 305 is measured by the light receiving element 304, and the tilt of the liquid surface 405 is measured by the light receiving element 404. The liquid surface 305 reflects the tilt of the main unit 10, and the liquid surface 405 reflects the tilt of the base 12. The light source 301 is shared by upper and lower tilt sensor units. The rotating mirror 406 selects one of a tilt sensor unit using the liquid surface 305 for the main unit 10 in an upper side, and a tilt sensor unit using the liquid surface 405 for the base 12 in a lower side.

The base 12 does not rotate relative to the ground, and thus, the liquid surface 405 is not affected by the rotation of the main unit 10 when the main unit 10 horizontally rotates. This function is used to correct the tilt amount (x, y) in consideration of the variation in the initial value ($x_0$, $y_0$) that is generated while the main unit 10 rotates. For example, in a case of tracking a UAV by the TS 100, the TS 100 may be operated with no time to stop the rotation of the main unit 10. In this case, with use of the configuration of the tilt sensor 300 in FIG. 8, the calculation result of the First Formula, which is the tilt amount (x, y), is corrected on the basis of the tilt amount of the base 12, whereby decrease in the measurement accuracy is prevented.

The following describes an example of a process in a case of using the tilt sensor 300 in FIG. 8. (1) First, when the main unit 10 is in the stationary state, a normal tilt (Tx, Ty), a horizontal angle H0, and a fixed tilt (Cx0, Cy0) are read. Herein, the normal tilt (Tx, Ty) is a tilt amount obtained from the tilt sensor unit for the main unit 10 in the upper side. The fixed tilt (Cx0, Cy0) is a tilt amount obtained from the tilt sensor unit for the base 12 in the lower side. In this case, the normal tilt (Tx, Ty) is obtained as an initial value of the tilt amount.

(2) Thereafter, while the main unit 10 rotates, the fixed tilt (Cx, Cy) is continuously read, and $\Delta Cx = Cx - Cx0$ and $\Delta Cy = Cy - Cy0$ are calculated. A tilt correction amount at a horizontal angle H1 is calculated from $Tx1 + \Delta Cx1$ and $Ty1 + \Delta Cy1$ under the condition that a tilt amount calculated from the First Formula is represented as (Tx1, Ty1). When the main unit 10 stops after being rotated, the process (1) is performed again. The processes (1) and (2) are performed by the tilt amount calculating part 124.

The variation in the initial value may occur because of an applied force due to touching to the TS 100 by a person, because of digging of the tip of the tripod supporting the TS 100 into the ground, or for other reasons. When there is no variation in the initial value of the tilt amount, $\Delta Cx$ and $\Delta Cy$ are zeros, and Tx1 and Ty1 are not corrected. In other words, when the initial value of the tilt amount varies, this variation is measured as $\Delta Cx$ and $\Delta Cy$, and the result of the First Formula is corrected.

The tilt sensor of this embodiment may be completely divided into two independent tilt sensors that are respectively arranged to the main unit 10 and the base 12. In this case, the result of the First Formula is corrected by using a measured value of the tilt of the base 12.

Other Matters

An optical device that performs optical surveying of the present invention may include an optical device that measures a horizontal direction and an optical device that measures a difference in height, in addition to the laser distance measuring device. That is, the present invention can be applied to a theodolite, an automatic level, a laser level, and other relevant devices.

What is claimed is:
1. A surveying device comprising:
a rotating unit including an optical device that performs optical surveying, the rotating unit being horizontally rotatable around a vertical axis;
a horizontal rotation angle sensor that measures a horizontal rotation angle of the rotating unit;
a first tilt sensor that is disposed on the rotating unit and measures a tilt of the rotating unit relative to a direction of gravity by optically measuring a tilt of a first surface of a first liquid;
a tilt calculating unit that calculates a tilt of the rotating unit after the rotating unit rotates based on outputs from the horizontal rotation angle sensor and the first tilt sensor before the rotating unit rotates and based on an output from the horizontal rotation angle sensor after the rotating unit rotates; and
a support that supports the rotating unit so that the rotating unit is horizontally rotatable,
wherein the tilt of the rotating unit is represented by an X component value and a Y component value (x, y) under conditions that a vertical vector along a vertical axis of the rotating unit is projected on an X-Y horizontal plane;
wherein the support is arranged with a second tilt sensor for measuring a tilt of the support, the second tilt sensor measures the tilt of the support while the rotating unit rotates horizontally, and the X component value and the Y component value (x, y) are corrected based on a value measured by the second tilt sensor,
the first tilt sensor comprises:
a light source;
a rotating mirror that reflects light projected by the light source selectively to a first direction and a second direction; and
a first light receiving element that receives the light reflected at the first surface of the first liquid; and
the second tilt sensor comprises:
a second surface of a second liquid that is arranged in the second direction; and
a second light receiving element that receives the light reflected at the second surface of the second liquid.

2. The surveying device according to claim 1, wherein the X component value and the Y component value (x, y) are calculated by the following First Formula:

$$\begin{pmatrix} x \\ y \end{pmatrix} = \begin{pmatrix} \cos(\theta - \theta_0) & \sin(\theta - \theta_0) \\ -\sin(\theta - \theta_0) & \cos(\theta - \theta_0) \end{pmatrix} \begin{pmatrix} x_0 \\ y_0 \end{pmatrix} \quad \text{First Formula}$$

in which the X component value and the Y component value before the rotating unit rotates are represented as $(x_0, y_0)$, a measured value from the horizontal rotation angle sensor before the rotating unit rotates is represented as $\theta_0$, and a measured value from the horizontal rotation angle sensor after the rotating unit rotates is represented as $\theta$.

3. The surveying device according to claim 2, wherein the X component value and the Y component value $(x_0, y_0)$ are obtained in a condition in which the rotating unit is in a stationary state.

4. The surveying device according to claim 2, wherein, under conditions that a value measured by an additional tilt sensor is represented as (Cx, Cy), and an initial value of the additional tilt sensor is represented as (Cx0, Cy0), the X component value and the Y component value (x, y) that are calculated by the First Formula are corrected to (x+Cx−Cx0, y+Cy−Cy0).

5. An apparatus, comprising:
a processor; and
a memory to store computer program instructions, the computer program instructions when executed on the processor cause the processor to perform operations comprising:
receiving, from a horizontal rotation angle sensor, a horizontal rotation angle of a rotating unit before the rotating unit rotates, the rotating unit including an optical device that performs optical surveying;
receiving, from a first tilt sensor, a tilt of the rotating unit relative to a direction of gravity before the rotating unit rotates, the first tilt sensor being disposed on the rotating unit and configured to optically measure a tilt of a first surface of a first liquid;
receiving, from the horizontal rotation angle sensor, a horizontal rotation angle of the rotating unit after the rotating unit rotates; and
calculating a tilt of the rotating unit after the rotating unit rotates based on the horizontal rotation angle of the rotating unit before the rotating unit rotates, the tilt of the rotating unit relative to the direction of gravity before the rotating unit rotates, and the horizontal rotation angle of the rotating unit after the rotating unit rotates, wherein
the rotating unit is supported by a support so that the rotating unit is horizontally rotatable,
wherein the tilt of the rotating unit is represented by an X component value and a Y component value (x, y) under conditions that a vertical vector along a vertical axis of the rotating unit is projected on an X-Y horizontal plane;
the support is arranged with a second tilt sensor for measuring a tilt of the support, the second tilt sensor measures the tilt of the support while the rotating unit rotates horizontally, and the X component value and the Y component value (x, y) are corrected based on a value measured by the second tilt sensor, the first tilt sensor comprises:
a light source;
a rotating mirror that reflects light projected by the light source selectively to a first direction and a second direction; and
a first light receiving element that receives the light reflected at the first surface of the first liquid; and
the second tilt sensor comprises:
a second surface of a second liquid that is arranged in the second direction; and
a second light receiving element that receives the light reflected at the second surface of the second liquid.

6. The apparatus according to claim 5, wherein the X component value and the Y component value (x, y) are calculated by the following First Formula:

$$\begin{pmatrix} x \\ y \end{pmatrix} = \begin{pmatrix} \cos(\theta - \theta_0) & \sin(\theta - \theta_0) \\ -\sin(\theta - \theta_0) & \cos(\theta - \theta_0) \end{pmatrix} \begin{pmatrix} x_0 \\ y_0 \end{pmatrix} \quad \text{First Formula}$$

in which the X component value and the Y component value before the rotating unit rotates are represented as $(x_0, y_0)$, a measured value from the horizontal rotation angle sensor before the rotating unit rotates is represented as $\theta_0$, and a measured value from the horizontal rotation angle sensor after the rotating unit rotates is represented as $\theta$.

7. The apparatus according to claim 6, the operations further comprising:
receiving, from an additional tilt sensor, a tilt of a support supporting the rotating unit while the rotating unit rotates horizontally, wherein the X component value and the Y component value (x, y) are corrected based on the tilt of the support while the rotating unit rotates horizontally.

8. The apparatus according to claim 7, wherein, under conditions that a value measured by the additional tilt sensor is represented as (Cx, Cy), and an initial value of the additional tilt sensor is represented as (Cx0, Cy0), the X component value and the Y component value (x, y) that are calculated by the First Formula are corrected to (x+Cx−Cx0, y+Cy−Cy0).

9. The apparatus according to claim 6, wherein the X component value and the Y component value $(x_0, y_0)$ are obtained in a condition in which the rotating unit is in a stationary state.

10. A method comprising:
measuring a horizontal rotation angle of a rotating unit before the rotating unit rotates, the rotating unit including an optical device that performs optical surveying;
measuring a tilt of the rotating unit relative to a direction of gravity before the rotating unit rotates;
measuring a horizontal rotation angle of the rotating unit after the rotating unit rotates; and
calculating a tilt of the rotating unit after the rotating unit rotates based on the horizontal rotation angle of the rotating unit before the rotating unit rotates, the tilt of the rotating unit relative to the direction of gravity before the rotating unit rotates, and the horizontal rotation angle of the rotating unit after the rotating unit rotates, the tilt of the rotating unit being measured by a first tilt sensor, the first tilt sensor being disposed on the rotating unit and configured to optically measure a tilt of a first surface of a first liquid, wherein
the rotating unit is supported by a support so that the rotating unit is horizontally rotatable,
the tilt of the rotating unit is represented by an X component value and a Y component value (x, y) under conditions that a vertical vector along a vertical axis of the rotating unit is projected on an X-Y horizontal plane, the support is arranged with a second tilt sensor for measuring a tilt of the support, the second tilt sensor measures the tilt of the support while the rotating unit rotates horizontally, and the X component value and the Y component value (x, y) are corrected based on a value measured by the second tilt sensor, the first tilt sensor comprises:
  a light source;
  a rotating mirror that reflects light projected by the light source selectively to a first direction and a second direction; and
  a first light receiving element that receives the light reflected at the first surface of the first liquid; and the second tilt sensor comprises:
  a second surface of a second liquid that is arranged in the second direction; and
  a second light receiving element that receives the light reflected at the second surface of the second liquid.

11. The method according to claim 10, wherein the X component value and the Y component value (x, y) are calculated by the following First Formula:

$$\begin{pmatrix} x \\ y \end{pmatrix} = \begin{pmatrix} \cos(\theta - \theta_0) & \sin(\theta - \theta_0) \\ -\sin(\theta - \theta_0) & \cos(\theta - \theta_0) \end{pmatrix} \begin{pmatrix} x_0 \\ y_0 \end{pmatrix} \quad \text{First Formula}$$

in which the X component value and the Y component value before the rotating unit rotates are represented as $(x_0, y_0)$, a measured value from a horizontal rotation angle sensor before the rotating unit rotates is represented as $\theta_0$, and a measured value from the horizontal rotation angle sensor after the rotating unit rotates is represented as $\theta$.

12. The method according to claim 11, wherein the X component value and the Y component value $(x_0, y_0)$ are obtained in a condition in which the rotating unit is in a stationary state.

13. The method according to claim 11, further comprising:
  measuring a tilt of a support supporting the rotating unit while the rotating unit rotates horizontally around a vertical axis, wherein the X component value and the Y component value (x, y) are corrected based on the tilt of the support while the rotating unit rotates horizontally.

* * * * *

UNITED STATES PATENT AND TRADEMARK OFFICE
CERTIFICATE OF CORRECTION

| | |
|---|---|
| PATENT NO. | : 11,448,504 B2 |
| APPLICATION NO. | : 16/048430 |
| DATED | : September 20, 2022 |
| INVENTOR(S) | : Nishita |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 437 days.

Signed and Sealed this
Thirteenth Day of August, 2024

Katherine Kelly Vidal
*Director of the United States Patent and Trademark Office*